(No Model.) 2 Sheets—Sheet 1.

J. P. HARTER.
RUNNING GEAR FOR VEHICLES.

No. 358,446. Patented Mar. 1, 1887.

Witnesses
Chas. L. Taylor
W. F. Burchard

Inventor
Jacob P. Harter
By his Attorneys
C. A. Snow & Co.

(No Model.) 2 Sheets—Sheet 2.
J. P. HARTER.
RUNNING GEAR FOR VEHICLES.
No. 358,446. Patented Mar. 1, 1887.
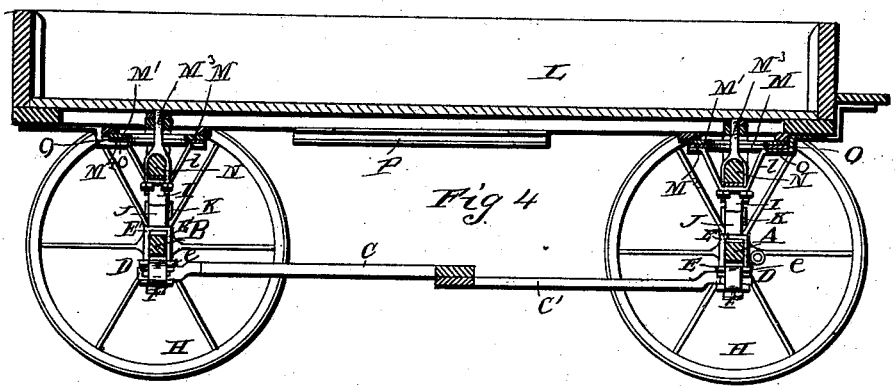
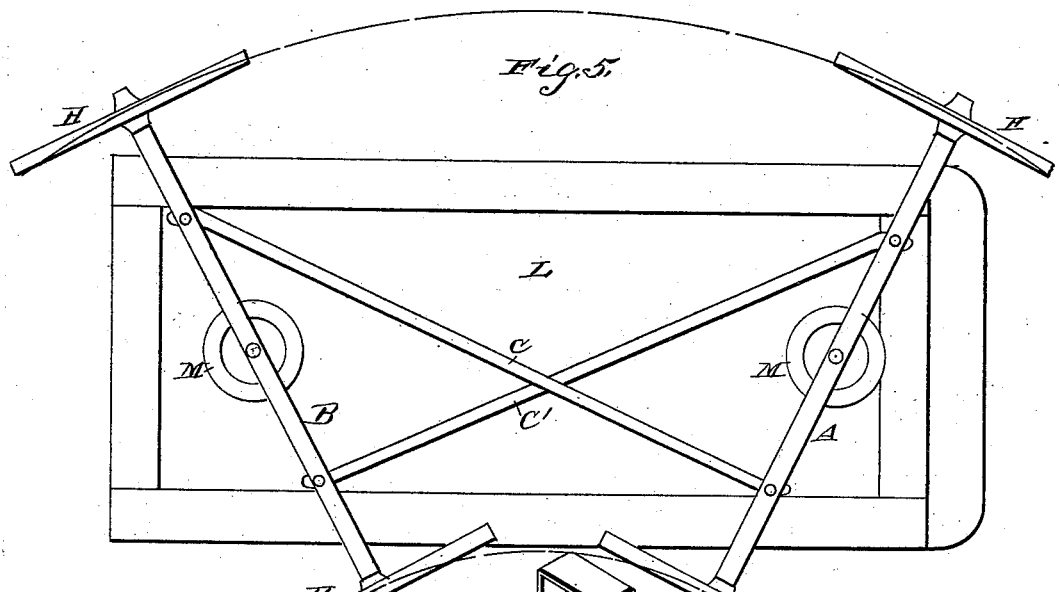
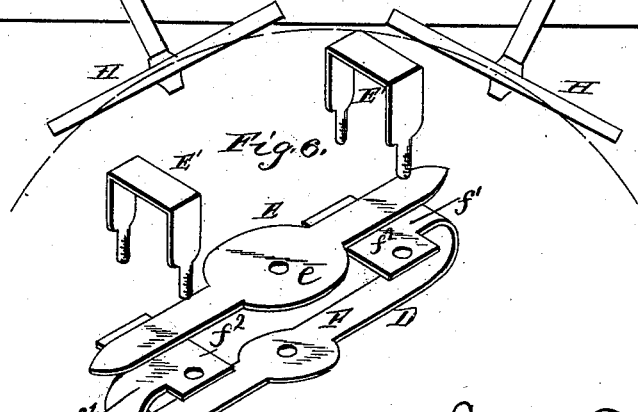
Witnesses
Inventor
Jacob P. Harter
By his Attorneys
N. PETERS, Photo-Lithographer, Washington, D. C.

UNITED STATES PATENT OFFICE.

JACOB P. HARTER, OF HERKIMER, NEW YORK.

RUNNING-GEAR FOR VEHICLES.

SPECIFICATION forming part of Letters Patent No. 358,446, dated March 1, 1887.

Application filed November 3, 1886. Serial No. 217,900. (No model.)

*To all whom it may concern:*

Be it known that I, JACOB P. HARTER, a citizen of the United States, residing at Herkimer, in the county of Herkimer and State of New York, have invented a new and useful Improvement in Vehicles, of which the following is a specification.

My invention relates to improvements in vehicles; and it consists of the peculiar combination of devices and novel construction and arrangement of the various parts for service, substantially as hereinafter fully described, and particularly pointed out in the claims.

The primary object of my invention is to provide an improved vehicle which can be safely and expeditiously turned around within a very much smaller area or space than is possible with wagons and other vehicles of ordinary construction, and which will not be liable to upset in turning sharp corners and curves.

With these and such other ends in view as are inherent upon the use of my invention, I pivot both the front and rear axles of the vehicle to the body and connect them in such a manner that they are inclined in reverse directions in turning curves or corners, and the front and rear wheels on the sides describe an arc of a circle of the same degree, the rear wheel at one side of the vehicle following in the track made by the front wheel on the same side.

My invention further consists in a peculiar form of spring for the support of the body to give the latter an easy and resilient motion, and in certain other details of construction that will be hereinafter fully described, and pointed out in the claims.

Figure 1:
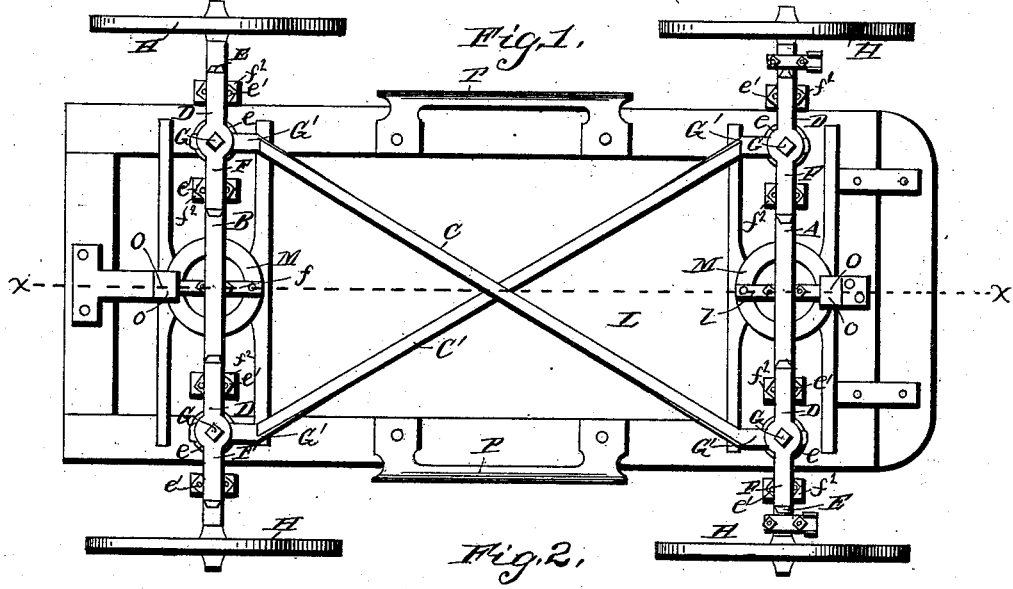
Figure 2:
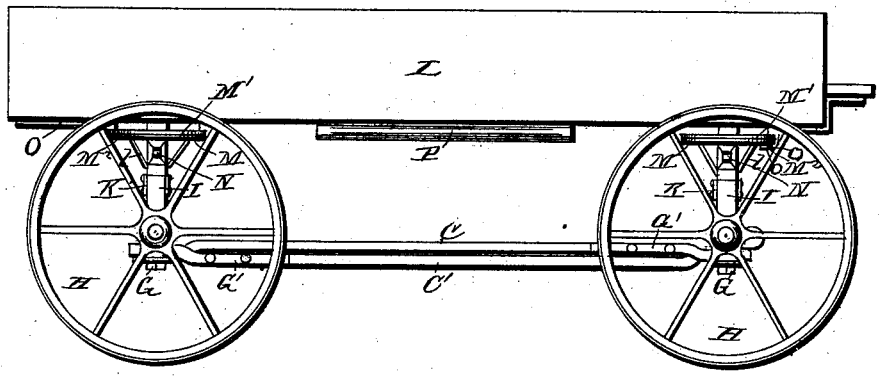
Figure 3:
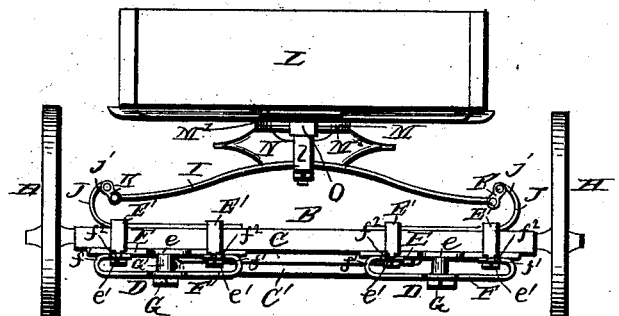

In the accompanying drawings, which illustrate a vehicle embodying my improvements, Figure 1 is a bottom plan view. Fig. 2 is a side elevation. Fig. 3 is an end elevation. Fig. 4 is a vertical longitudinal sectional view on the line *x x* of Fig. 1. Fig. 5 is a diagram view showing the position assumed by the axles and the wheels thereof in turning or rounding a curve. Fig. 6 is a detached perspective view of one of the brackets for connecting one end of a reach and one end of a spring to the axle.

Referring to the drawings, in which like letters of reference denote corresponding parts in all the figures, A designates the front and B the rear axle of a vehicle embodying my improvements. These axles are connected together by intermediate reaches, C C', which are arranged diagonally with respect to each other and cross or intersect one another at an intermediate point of their length, and the terminal ends of the reaches are pivotally connected to the axles, near the outer ends thereof, by means which I will presently describe, so that when the front axle is turned by the team or animal connected thereto the reaches will transmit the movement thereof to the rear axle and turn or incline the latter in the reverse direction to the inclination of the front axle, whereby one end of both the front and rear axles are brought nearer together while the opposite ends of the axles are forced farther apart, so that the wheels on one side of the vehicle will follow in the same track, and thereby describe an arc of a circle of the same degree of curvature.

Each of the front and rear axles is provided with two brackets, D, to which the ends of the reaches C C' are connected. One bracket of each axle is rigidly affixed or secured thereto near the ends thereof, and each bracket comprises an upper plate or section, E, and a lower plate or section, F, which are very firmly connected together and to the axle on the under side of the same. The upper plate, E, is applied to the lower or under side of the axle, and at its center it has an integral boss or enlargement, *e*, and the lower plate or section, F, is arranged beneath the upper section and parallel therewith, to provide or form an intermediate space in which the end of the reach is fitted. The lower section or plate of the bracket is also provided with an enlargement or boss near its middle which aligns with the boss of the upper section, and in these aligned bosses of the upper and lower sections of the bracket is pivoted the short shaft or trunnion G, that is formed on or connected with a coupling-iron, G', which is rigidly affixed to the end of the reach, thus pivotally connecting the reach with the bracket, which in turn is rigidly affixed to the axle. The ends of the lower section or plate, F, of the bracket are bent or turned upon itself to provide the extended arms $f'$, and the ends of these arms are provided with integral perforated lugs or ears $f^2$, which are projected laterally of the arms, so that when the latter are fitted against the lower sides of the upper section, E, of the bracket the said perforated ears project from opposite sides of the axle. Vertically-disposed clips E' are passed at their lower ends through these ears or lugs of the lower section of the bracket; and the lower terminal ends of the arms of the clips are threaded to receive suitable binding-nuts, $e'$, which bear or impinge upon the lugs of the lower section of the bracket. The clips straddle the axle, two being provided for each bracket, and the clips press the lower section of the bracket against the upper section thereof, and thereby hold both themselves and the sections of the bracket against displacement. It will thus be seen that the brackets are very securely and firmly connected to the axles on the under sides thereof, and that the reaches are connected pivotally to the brackets and thereby held from displacement on the axles, which they actuate simultaneously.

Each end of each reach is provided with one of the coupling-irons, which are rigidly affixed thereto and pivotally connected with the fixed brackets, and the reaches are arranged one beneath the other, so that they can readily cross one another and move in their required directions without interference or hinderance from one another.

Each end of the axles has the carrying or supporting wheels H loosely fitted thereon, so as to rotate without affecting the rotation of the axles, and the wheels are held from displacement on the axles by any suitable or preferred mechanism.

I designates the transverse springs, which are arranged above each of the axles and connected thereto at its ends through intermediate supplemental springs J, which are connected to the axles by means of the same clips, E', that secure the brackets to the axles.

The lower ends of the intermediate supplemental springs bear or rest upon the axles and are passed through the clips E', so that the said clips serve to firmly and securely connect the intermediate springs to the axles, and the outer free ends of the said supplemental springs are bent or curved upon themselves to provide the overhanging arm $j$, which is loosely connected to the free ends of the transverse main spring I through the intermediate shackles K, which are pivotally connected at their ends to the free ends of the main transverse spring and the overhanging arm $j$ of the supplemental spring J. One of these transverse springs I is provided for both the front and rear axles, and the said spring is connected to the axle by two of the intermediate supplemental springs, one of the supplemental springs being affixed or connected to the axle near each end thereof.

L designates the vehicle-body, which is of any approved or desired pattern or construction, and to the opposite ends of this body is connected a fifth-wheel, M, which lies between the body and the axle and main spring I. Each of these fifth-wheels is composed of an upper section, M', and a lower section, M², which are united or connected together by a vertical king-bolt, M³, which passes through the centers of the said sections of the fifth-wheel. These fifth-wheel sections impinge and bear upon one another, and they are capable of horizontal rotation independently of one another upon the king-bolt. The upper section of the fifth-wheel is rigidly affixed or secured by bolts or other suitable means to the body of the vehicle, and the lower section of the fifth-wheel is likewise affixed or connected to a head-block, N, which in turn is rigidly secured upon the transverse main spring I at or near the center thereof. The lower end of the king-bolt passes through the lower section of the fifth-wheel, the head-block, and the transverse spring I, and the said lower section of the fifth-wheel has a strap, $l$, rigidly affixed thereto and embracing the head-block and the spring to more firmly unite and brace the several parts together, and thereby materially increase the strength and stability thereof.

It will thus be seen that both the front and rear axles of the vehicle are pivotally connected in a firm and secure manner with the body of the vehicle, so that they can be turned without disturbing the horizontal position of the body, and that the body is yieldingly mounted upon the axles to insure an easy and resilient carriage or motion thereto.

The operation of my invention will be very readily understood by those skilled in the art to which it relates from the foregoing description, taken in connection with the accompanying drawings.

The shafts or draft-pole are connected to the front axle of the vehicle in any preferred well-known manner, and when the animals round a curve or corner the front axle thereof is turned in the proper direction. The movement of the front axle is transmitted through the intermediate reaches to the rear axle to incline the latter in the reverse direction to the inclination of the front axle, the shifting movement of the axles taking place simultaneously. As will be seen by reference to Fig. 5 of the drawings, the ends of the front and rear axles nearest to the object to be avoided are thrown nearer to each other, and the opposite ends of the said axles are thrown farther apart, and the arc of a circle described by the wheels on the front and rear axles on one side of the vehicle is of the same degree of curvature, so that the said wheels of the rear axle travel in the same tracks formed by the wheels of the front axle, thereby leaving but two tracks. By this peculiar arrangement of parts the vehicle can be turned within a much shorter space or area and without danger of upsetting the vehicle, and when the vehicle is turned out of a rut in the road all of the wheels emerge at the same time.

The wheels of the vehicle can be so adjusted that the rider or occupant can alight from the side of the body without soiling or otherwise injuring the clothing, and the parts of the invention are very simple and strong in construction, effective and reliable in operation, and cheap of manufacture.

A brace-iron, O, is rigidly affixed at each end of the vehicle-body, on the lower under side thereof, and one end of the said iron has an extended lip, o, which takes beneath the lower fifth-wheel section, to aid in supporting the latter and holding the same in its proper position.

Wear-plates P are rigidly affixed to opposite sides of the vehicle-body, so that the wheels will come in contact therewith when rounding curves and be thereby prevented from injuring or defacing the body of the vehicle.

Having thus fully described my invention, what I claim as new, and desire to secure by Letters Patent, is—

1. In a vehicle, the combination of the axles, the brackets rigidly affixed to the axles and each comprising the upper and lower sections, arranged parallel with each other, and the clips straddling the axles and securing the sections of the brackets thereto, and the diagonal reaches pivotally connected at their ends to the brackets, substantially as described, for the purpose set forth.

2. In a vehicle, the combination of the front and rear axles, the brackets having the parallel sections and rigidly affixed to the axles, and the diagonal reaches having the coupling-irons rigidly affixed to the terminal ends of the same and pivotally connected with the brackets between the sections of the same, substantially as described, for the purpose set forth.

3. In a vehicle, the combination of the front and rear axles, the diagonal-crossed reaches pivotally connected to the axles, the springs supported upon the axles, the fifth-wheels supported on the springs and having the vertical king-bolt, and the body connected to one of the fifth-wheel sections, substantially as described, for the purpose set forth.

4. In a vehicle, the combination of the front and rear axles, the brackets affixed to the axles, the diagonal-crossed reaches pivotally connected to the brackets, the supplemental springs rigidly connected to the axles and having the overhanging arms, a body, a spring connected at its terminal ends to the overhanging arms of the supplemental springs by intermediate shackles, and the fifth-wheel connected to the body and to the transverse spring by an intermediate head-block and the vertical king-bolt, substantially as described, for the purpose set forth.

5. The combination of the axles, the brackets rigidly affixed thereto, and the diagonal-crossed reaches pivotally connected to the brackets, the said brackets consisting of the upper and lower parallel sections, the lower section having the central perforated enlargement and the upturned ends carrying perforated lugs, and the upper section having a like central perforated enlargement and clips encircling the axle and passing through the perforated lugs of the lower section of the bracket, substantially as specified.

In testimony that I claim the foregoing as my own I have hereto affixed my signature in presence of two witnesses.

JACOB P. HARTER.

Witnesses:
 WILLIAM WITHERSTINE,
 IRVING O. NELLIS.